(12) United States Patent
Fujino et al.

(10) Patent No.: US 8,822,080 B2
(45) Date of Patent: Sep. 2, 2014

(54) POSITIVE ACTIVE MATERIAL FOR LITHIUM SECONDARY BATTERY, ELECTRODE FOR LITHIUM SECONDARY BATTERY, AND LITHIUM SECONDARY BATTERY

(75) Inventors: Yukiko Fujino, Kyoto (JP); Yoshinobu Yasunaga, Kyoto (JP); Toru Tabuchi, Kyoto (JP); Tokuo Inamasu, Kyoto (JP); Toshiyuki Nukuda, Kyoto (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 226 days.

(21) Appl. No.: 13/505,123

(22) PCT Filed: Oct. 27, 2010

(86) PCT No.: PCT/JP2010/069055
§ 371 (c)(1),
(2), (4) Date: Apr. 30, 2012

(87) PCT Pub. No.: WO2011/052632
PCT Pub. Date: May 5, 2011

(65) Prior Publication Data
US 2012/0219862 A1    Aug. 30, 2012

(30) Foreign Application Priority Data
Nov. 2, 2009    (JP) .................. 2009-251953

(51) Int. Cl.
| | | |
|---|---|---|
| C01B 35/10 | (2006.01) |
| H01M 4/40 | (2006.01) |
| H01M 4/38 | (2006.01) |
| C01B 35/12 | (2006.01) |
| C01B 35/14 | (2006.01) |
| H01M 4/136 | (2010.01) |
| H01M 4/36 | (2006.01) |
| H01M 4/58 | (2010.01) |
| H01M 4/62 | (2006.01) |
| H01M 10/052 | (2010.01) |
| H01M 4/02 | (2006.01) |

(52) U.S. Cl.
CPC ........... *C01B 35/1027* (2013.01); *H01M 4/405* (2013.01); *H01M 4/381* (2013.01); *H01M 4/382* (2013.01); *H01M 4/40* (2013.01); *C01B 35/121* (2013.01); *C01B 35/143* (2013.01); *C01P 2004/51* (2013.01); *C01P 2006/12* (2013.01); *H01M 4/136* (2013.01); *H01M 4/366* (2013.01); *H01M 4/5825* (2013.01); *H01M 4/625* (2013.01); *H01M 10/052* (2013.01); *H01M 2004/021* (2013.01); *Y02E 60/122* (2013.01); *Y02T 10/7011* (2013.01)
USPC ...................................... 429/231.95

(58) Field of Classification Search
USPC ...................................... 429/231.95
See application file for complete search history.

(56) References Cited

U.S. PATENT DOCUMENTS

| | | | |
|---|---|---|---|
| 4,206,016 A * | 6/1980 | Booth ........................ | 205/409 |
| 4,317,874 A * | 3/1982 | Joshi et al. .................. | 429/213 |
| 5,871,866 A | 2/1999 | Barker et al. | |
| 7,759,006 B2 | 7/2010 | Chang et al. | |
| 7,776,234 B2 | 8/2010 | Gauthier et al. | |
| 7,914,932 B2 * | 3/2011 | Yoshida et al. .............. | 429/304 |
| 2001/0028980 A1 * | 10/2001 | Yoshimura et al. ....... | 429/231.95 |
| 2003/0049529 A1 | 3/2003 | Cho et al. .................... | 429/217 |
| 2004/0038043 A1 * | 2/2004 | Golecki et al. .............. | 428/426 |
| 2004/0229124 A1 * | 11/2004 | Miyamoto et al. ......... | 429/231.1 |
| 2006/0014079 A1 | 1/2006 | Chang et al. | |
| 2007/0099081 A1 * | 5/2007 | Matsuda et al. ............. | 429/217 |
| 2007/0099087 A1 * | 5/2007 | Mihara et al. ........... | 429/231.95 |
| 2007/0160752 A1 | 7/2007 | Mao | |
| 2007/0298324 A1 * | 12/2007 | Kawasato et al. ........ | 429/231.95 |
| 2008/0206643 A1 * | 8/2008 | Nakane et al. ............... | 429/223 |
| 2008/0206644 A1 * | 8/2008 | Kanno et al. ................ | 429/224 |
| 2008/0213674 A1 * | 9/2008 | Okada et al. ................. | 429/344 |
| 2008/0268342 A1 * | 10/2008 | Suzuki et al. .............. | 429/231.5 |
| 2010/0266899 A1 * | 10/2010 | Barker et al. ................. | 429/221 |

FOREIGN PATENT DOCUMENTS

| | | |
|---|---|---|
| JP | 2004-178835 | 6/2004 |
| JP | 2009-231206 A | 10/2009 |
| JP | 2010-003593 | 1/2010 |

* cited by examiner

*Primary Examiner* — Jeremiah Smith
(74) *Attorney, Agent, or Firm* — Manabu Kanesaka

(57) ABSTRACT

The present invention provides a $Li_3V_2(PO_4)_3$-based positive active material for a lithium secondary battery, which has high discharge capacity and excellent storage performance, particularly high-temperature storage performance; and a lithium secondary battery made using the positive active material. The positive active material for a lithium secondary battery has general formula $Li_3V_2(PO_4)_{3-x}(BO_3)_x$ ($0<x\leq 2^{-2}$). It is preferable that x be $2^{-7}\leq x\leq 2^{-3}$. Also provided are a positive electrode for a lithium secondary battery containing the positive active material; and a lithium secondary battery including the positive electrode.

10 Claims, No Drawings

POSITIVE ACTIVE MATERIAL FOR LITHIUM SECONDARY BATTERY, ELECTRODE FOR LITHIUM SECONDARY BATTERY, AND LITHIUM SECONDARY BATTERY

RELATED APPLICATIONS

The present application is National Phase of International Application No. PCT/JP2010/069055 filed Oct. 27, 2010, and claims priorities from Japanese Application No. 2009-251953 filed Nov. 2, 2009.

TECHNICAL FIELD

The present invention relates to a $Li_3V_2(PO_4)_3$-based compound that is usable as a positive active material for a lithium secondary battery, and also to a lithium secondary battery using the same.

BACKGROUND ART

In recent years, as the power supply for portable devices such as mobile phones and laptop computers, electric vehicles, and the like, attention has been focused on nonaqueous electrolyte secondary batteries having high energy density, little self-discharge, and excellent cycle performance, such as lithium secondary batteries. Nowadays, the mainstream lithium secondary batteries are small consumer batteries, mainly including mobile phone batteries having a capacity of 2 Ah or less. A large number of proposals have been made as positive active materials for lithium secondary batteries, and the most commonly known are lithium-containing transition metal oxides having an redox potential of about 4 V, whose basic structure is lithium cobalt oxide ($LiCoO_2$), lithium nickel oxide ($LiNiO_2$), lithium manganese oxide ($LiMn_2O_4$) with a spinel structure, etc. In particular, lithium cobalt oxide has excellent charge-discharge characteristics and energy density, and thus has been widely adopted as a positive active material for small-capacity lithium secondary batteries having a battery capacity of up to 2 Ah.

However, in consideration of the future development of nonaqueous electrolyte batteries into middle-sized and large-sized batteries, particularly those for industrial applications where a huge market is expected, there is a need for a positive active material having higher capacity and higher safety and higher storage performance.

Accordingly, recently, as a positive active material having high capacity and safety, a lithium-containing phosphate having a high proportion of lithium per formula unit, such as $Li_3V_2(PO_4)_3$, has been proposed (see Patent Document 1).

The following invention is also known: "a secondary battery containing as an active material a material represented by $M_aN_bX_c$ (1) [in formula (1), M is selected from H, Li, Na, Mg, Al, K, and Ca, N represents at least one member selected from transition metals, Al, and Cu, X represents a polyanion, a represents 0 to 5, b represents 1 to 2, and c represents 1 to 3]" (see Patent Document 2). Patent Document 2 states "in formula (1), X is preferably at lease one polyanion selected from $SiO_4$, $PO_4$, $SO_4$, $MoO_4$, $WO_4$, $BO_4$, and $BO_3$, and more preferably $PO_4$ or $MoO_4$" (paragraph [0023]). However, examples of the positive active material shown in the Description are "$LiFePO_4$, $LiCoPO_4$, $LiNa_2PO_4$, $Li_3V_2(PO_4)_3$, $Na_3V_2(PO_4)_3$, and $LiVPO_4F$, $NaVPO_4F$" (paragraph [0024]). Further, merely "$Li_3V_2(PO_4)_3$, $Na_3V_2(PO_4)_3$, and $LiVPO_4F$" are shown in the Examples (paragraph [0046], Table 1). Thus, the substitution a part of $PO_4$ in $Li_3V_2(PO_4)_3$ with $BO_3$ is not mentioned.

According to the invention described in Patent Document 2, "an object is to provide a secondary battery using a liquid electrolyte with excellent storage characteristics" (paragraph [0007]), and "at the same time, it has been found that when an active material having a so-called NASICON structure is used as a material for the positive electrode and the negative electrode, a secondary battery containing an ionic liquid as the electrolyte with excellent storage characteristics and safety can be provided" (paragraph [0008]). However, it does not suggest that storage characteristics are improved by the substitution a part of $PO_4$ in $Li_3V_2(PO_4)_3$ with $BO_3$.

The following invention is also known: "a method for preparing a composite material containing an electrode active compound of formula $A_aD_dM_mZ_zO_oN_nF_f$ (wherein A is an alkali metal, D is selected from alkaline earth metals and elements of Group III of the element periodic table (except for B), M is a transition metal or a transition metal mixture, Z is a nonmetal selected from S, Se, P, As, Si, Ge, Sn, and B, O is oxygen, N is nitrogen, F is fluorine, and a, d, m, z, o, n, and f are each a real number of 0 or more and selected to ensure electrical neutrality) and an electrically conductive compound like carbon, the method including thermally decomposing a homogeneously mixed precursor within a short period of time to produce the composite material, the precursor containing all the elements A, D, M, Z, O, N, and F forming the electrode activity compound and at least one organic compound and/or organometallic compound" (see Patent Document 3). Patent Document 3 states "A is selected from Li, Na, K, and mixtures thereof" (claim 3) and "M is selected from Fe, Ni, Co, Mn, V, Mo, Nb, W, Ti, and mixtures thereof" (claim 5). However, an electrode active compound specifically mentioned is "a lithium insertion compound or a sodium insertion compound, such as $LiFePO_4$, $LiFeBO_3$, or $NaFeBO_3$" (claim 6). Thus, an electrode active compound with $PO_4$ in $Li_3V_2(PO_4)_3$ or $Li_3V_2(PO_4)_3$ being partially substituted with $BO_3$ is nowhere mentioned.

Patent Document 3 states "there also is a need for a method for preparing a composite material that provides a high-purity final product with completely controlled, homogeneous morphology. This composite material shows excellent electrochemical kinetics, and can be used at high charge/discharge rate" (paragraph [0035]). However, storage performance is nowhere suggested.

Further, the following invention is known: "a nonaqueous electrolyte secondary battery containing, as a positive active material, a compound represented by composition formula $Li_{1+a}FeP_{1-x}M_xO_{4-b}$ (M: at least one element selected from trivalent elements, $0<x<1$, $0 \leq a \leq 2x$, and $0 \leq b \leq x$, with the proviso that x, a, and b are selected to allow a compound represented by the composition formula to maintain electrical neutrality); as a negative active material, a substance capable of reversibly inserting/extracting or absorbing/releasing lithium, other alkali metals, or ions thereof; and, as an electrolytic substance, a substance that is chemically stable to a positive active material and a negative active material and capable of moving the ions thereof to undergo an electrochemical reaction (see Patent Document 4). Patent Document 4 states "the positive active material is a compound wherein M is at least one of B and Al" (claim 2). It also shows that the discharge capacity is greatly increased by the substitution a part of $PO_4$ in $LiFePO_4$ with $BO_3$ (paragraph [0040], Table 1). However, the substitution a part of $PO_4$ in $Li_3V_2(PO_4)_3$ with $BO_3$ is nowhere suggested, and there is no suggestion about storage performance either.

Patent Document 5 discloses an electrode active material (claim 4) containing "a compound represented by the following formula (1):

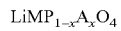 Formula (1)

(wherein M is a transition metal, A is an element having an oxidation number of +4 or less, and 0<X<1)" (claim 1). Patent Document 5 also states "in the formula, M is at least one transition metal selected from the group consisting of Fe, Co, Mn, Ni, V, Cu, and Ti" (claim 2) and "in the formula, A is an element selected from the group consisting of Ti (4+), Al (3+), B (3+), Zr (4+), Sn (4+), V (4+), Pb (4+), and Ge (4+)" (claim 3). However, it does not specifically states that M is V and A is B (3+), and there is no suggestion about storage performance either.

Patent Document 6 discloses an improvement of the charge capacity and cycle life of a cathode material of a battery having a polyanionic powder of lithium metal, and states "the polyanionic powder of lithium metal has a polyanion containing boron, phosphorus, silicon, aluminum, sulfur, fluorine, chlorine, or a combination thereof" (claim 2) and "the polyanion contains $BO_3^{3-}$, $PO_4^{3-}$, $AlO_3^{3-}$, $AsCl_4^{-}$, $AsO_3^{3-}$, $SiO_3^{3-}$, $SO_4^{2-}$, $BO_3^{-}$, $AlO_2^{-}$, $SiO_3^{2-}$, $SO_4^{2-}$, or a combination thereof" (claim 3). However, merely a lithium vanadium phosphate powder (Example 2) is specifically shown. The substitution a part of $PO_4^{3-}$ with $BO_3^{3-}$ is nowhere suggested, and there is no suggestion about storage performance either.

PRIOR ART DOCUMENTS

Patent Documents

Patent Document 1: Japanese Patent No. 4292317
Patent Document 2: JP-A-2008-235260
Patent Document 3: Published Japanese Translation of PCT Patent Application No. 2007-520038
Patent Document 4: JP-A-2004-178835
Patent Document 5: Published Japanese Translation of PCT Patent Application No. 2008-506243
Patent Document 6: Published Japanese Translation of PCT Patent Application No. 2009-522749

DISCLOSURE OF THE INVENTION

Problems to be Solved by the Invention

An object of the present invention is to provide a $Li_3V_2(PO_4)_3$-based positive active material for a lithium secondary battery, which has higher discharge capacity and better storage performance, particularly high-temperature storage performance, than positive active materials of the related arts shown above; and a lithium secondary battery made using the positive active material.

Solutions to the Problems

The configuration and function effects of the present invention are as shown below. However, the function mechanisms described herein include presumptions, and whether it is right or wrong does not limit the present invention in any way.

The present invention is a positive active material for a lithium secondary battery, having general formula $Li_3V_2(PO_4)_{3-x}(BO_3)_x$ $(0<x\leq 2^{-2})$. This positive active material is obtained by the substitution a part of $PO_4$ in $Li_3V_2(PO_4)_3$ with $BO_3$ and thus has excellent storage performance. It is preferable that x is x $2^{-7}\leq x\leq 2^{-3}$.

Further, the present invention also encompasses a positive electrode for a lithium secondary battery, which contains the positive active material mentioned above; and a lithium secondary battery including the positive electrode, a negative electrode, and a nonaqueous electrolyte.

Advantages of the Invention

According to the present invention, a part of $PO_4$ in a $Li_3V_2(PO_4)_3$-based positive active material for a lithium secondary battery are substituted with $BO_3$, whereby a positive active material for a lithium secondary battery having excellent storage performance, particularly especially high-temperature storage performance, can be provided.

Embodiments of the Invention

The present inventors have picked up lithium vanadium phosphate $Li_3V_2(PO_4)_3$ having a highly safety, 4V positive active material to replace lithium iron phosphate, and have studied changes in battery characteristics due to the substitution of a part of the cations or anions. As a result, they have found that when a part of the $PO_4$ in $Li_3V_2(PO_4)_3$ are substituted with $BO_3$, such a positive active material has significantly improved high-temperature storage performance over $Li_3V_2(PO_4)_3$. They thus have accomplished the present invention.

The positive active material for a lithium secondary battery of the present invention is represented by general formula $Li_3V_2(PO_4)_{3-x}(BO_3)_x$, wherein $0<x\leq 2^{-2}$. When x is not more than $2^{-2}$, high-temperature storage performance is significantly improved. When x is more than $2^{-2}$, upon storage at a high temperature, as shown in comparative examples below, discharge capacity before storage decreases, and storage performance also decreases; this is thus undesirable.

When x is within a range of $2^{-7}\leq x\leq 2^{-3}$, as shown in the Examples, discharge capacity before high-temperature storage slightly decreases as compared with $Li_3V_2(PO_4)_3$ wherein x=0. However, because high-temperature storage performance is significantly improved, discharge capacity after high-temperature storage significantly increases.

The positive active material of the present invention does not exclude those in which V or Li in the above general formula is partially substituted with a transition metal element other than V, such as Fe, Mn, or Ni. In addition, the polyanion unit ($PO_4$) may have small amounts of other anions such as ($WO_4$), ($MoO_4$), and ($SiO_4$) in a solid solution state to the extent that they do not interfere with the advantage of the present invention given by the substitution with $BO_3$. They are also encompassed by the scope of the present invention.

The method for synthesizing the polyanionic positive active material according to the present invention is not particularly limited. Specific examples thereof include a solid-phase method, a liquid-phase method, a sol-gel method, and a hydrothermal method.

Basically, a composite of raw material having in the composition of the active material to be obtained in which a raw material that contains metal elements for forming an active material (Li, V) and a raw material that serves as a phosphoric acid source or a boric acid source is prepared, and then fired to produce the positive active material. At this time, the composition of the actual resulting compound may slightly vary from the composition calculated from the raw material feed ratio. The present invention can be implemented without deviating from its technical concept or main feature, and, needless to say, even when the composition of the product resulting from the production does not strictly agree with the above composition formula, such a product cannot be interpreted as being outside the range of the present invention only for this reason. In particular, it is known that a lithium source tends to be partially volatilized during calcination. Accordingly, as a raw material before calcination, a lithium source is usually fed in an amount more than equimolar to V.

Examples of a Li-containing raw material include lithium carbonate ($Li_2CO_3$), lithium hydroxide (LiOH), lithium nitrate ($LiNO_3$), and lithium acetate (CH3COOLi). As a V-containing raw material, vanadium (V) oxide ($V_2O_5$) is usually used. However, it is also possible to use a lowly oxidized vanadium (V) oxide, such as $V_2O_3$, or ammonium vanadate. Examples of the phosphoric acid source include ammonium phosphate, ammonium dihydrogen phosphate, and diammonium hydrogen phosphate. Examples of the boric acid source include boric acid and boric anhydride ($B_2O_3$). In addition, as the Li-containing phosphoric acid source or boric acid source, it is also possible to use lithium phosphate ($Li_3PO_4$), lithium dihydrogen phosphate ($LiH_2PO_4$), or lithium borate.

Further, for the purpose of improving electron conductivity, it is preferable that the positive active material particles have a carbon deposit or coating surface of, which is made mechanically or by the thermal decomposition of an organic compound, for example.

In particular, in the positive active material based on a lithium-transition metal-phosphate compound according to the present invention, in order for the effects of the present invention to be sufficiently exerted, it is important to ensure sufficient electronic conduction between particles by carbon or the like.

In the present invention, the method for making a carbon deposit or coating on the surface of positive active material particles is not particularly limited. For example, it can be achieved by heat-treating polymer organic compound and positive active material particles. The heat treatment temperature needs to be equal to or higher than the temperature at which the polymer organic compound is thermally decomposed, and is preferably equal to or lower than the temperature as which particle growth occurs in the positive active material particles. As the polymer organic compound, sucrose or polyvinyl alcohol is mentioned, for example. Alternatively, it is also possible to employ a method in which positive active material particles are placed in a temperature-rising atmosphere, and a gaseous organic compound is introduced to cause carbon deposition and vapor growth on the surface of the positive active material particles. As the gaseous organic compound, an evaporated monohydric alcohol such as methanol, ethanol, isopropanol, or butanol is mentioned. In addition, in the case of hydrothermal synthesis, an organic compound such as citric acid or ascorbic acid may be added to a water bath for the purpose of preventing oxidation. In such a case, the positive active material, which is the final product, may have on the surface thereof a deposit or coating of carbon originating from the organic compound, and thus may be used as it is. Of course, the method using a polymeric organic compound or a gaseous organic compound mentioned above may further be used together. For all of the above methods, examples and comparative examples of WO 2007/043665, for example, may be referred to.

In the present invention, it is preferable that the polyanionic positive active material used in a positive electrode for a lithium secondary battery is in the form of a powder having an average secondary particle size of 100 μm or less. In particular, a smaller particle size is more preferable. It is more preferable that the average particle size of secondary particles be 0.5 to 20 μm, and it is preferable that the particle diameter of primary particles forming the secondary particles be 1 to 500 nm. Further, for the improvement of the high-rate discharge performance of the positive electrode, powder particles having a larger specific surface area are more desirable. The specific surface area is preferably 1 to 100 $m^2/g$, and more preferably 5 to 100 $m^2/g$. In order to obtain a powder in a predetermined shape, a crusher or a classifier can be used. For example, a mortar, a ball mill, a sand mill, a vibration ball mill, a planet ball mill, a jet mill, a counter jet mill, a swirling-flow-type jet mill, a sieve, and the like are usable. At the time of crushing, wet crushing may be employed, where water or an organic solvent, such as alcohol or hexane, is allowed to coexist. The classification method is not particularly limited. As required, a sieve, an air classifier, or the like can be used in a dry process or a wet process.

With respect to an electrical conductor and a binder, well known ones may be used according to well known formulations.

With respect to the moisture content of a positive electrode containing the positive active material of the present invention, a smaller content is more desirable. Specifically, it is preferable that the content be less than 500 ppm.

Further, with respect to the thickness of an electrode composite material layer, in terms of the balance with the energy density of a battery, the thickness of the electrode composite material layer to which the present invention is applied is preferably 20 to 500 μm.

The negative electrode of the battery of the present invention is not limited. Examples thereof include lithium metal and lithium alloys (lithium-metal-containing alloys such as lithium-aluminum, lithium-lead, lithium-tin, lithium-aluminum-tin, lithium-gallium, and Wood's metal), as well as alloys capable of insertion/extraction of lithium, carbon materials (e.g., graphite, hard carbon, low-temperature-sintered carbon, and amorphous carbon), metal oxides, lithium metal oxides ($Li_4Ti_5O_{12}$, etc.), and polyphosphate compounds. Among them, graphite has an redox potential extremely close to metallic lithium and enables charge-discharge at a high operating voltage, and thus is a preferred negative electrode material. For example, artificial graphite and natural graphite are preferable. In particular, graphite in which negative active material particles are surface-modified with amorphous carbon or the like leads to less generation of gas during charging, and thus is desirable.

A lithium secondary battery is generally configured to include a positive electrode, a negative electrode, and a nonaqueous electrolyte in which an electrolyte salt is contained in a nonaqueous solvent. Generally, a separator is provided between the positive electrode and the negative electrode, and an exterior body for packaging them is also provided.

Examples of the nonaqueous solvent include cyclic carbonates such as propylene carbonate and ethylene carbonate; cyclic esters such as γ-butyrolactone and γ-valerolactone; chain carbonates such as dimethyl carbonate, diethyl carbonate, and ethyl methyl carbonate; chain esters such as methyl formate, methyl acetate, and methyl butyrate; tetrahydrofuran and derivatives thereof; ethers such as 1,3-dioxane, 1,4-dioxane, 1,2-dimethoxyethane, 1,4-dibutoxyethane, and methyl diglyme; nitriles such as acetonitrile and benzonitrile; dioxolane and derivatives thereof; and ethylene sulfide, sulfolane, sultone, and derivatives thereof. They may be used alone, and it is also possible to use a mixture of two or more kinds, for example. However, the nonaqueous solvent is not limited thereto.

Examples of the electrolyte salt include ionic compounds such as $LiBF_4$ and $LiPF_6$. These ionic compounds may be used alone, and it is also possible to use a mixture of two or more kinds. In order to reliably obtain a nonaqueous electrolyte battery having high battery characteristics, the concentration of the electrolyte salt in the nonaqueous electrolyte is preferably 0.5 mol/l to 5 mol/l, and still more preferably 1 mol/l to 2.5 mol/l.

EXAMPLES

Hereinafter, the present invention will be described in further detail with reference to examples. However, the present invention is not limited the following examples.

Example 1

Synthesis of $Li_3V_2(PO_4)_{11/4}(BO_3)_{1/4}$ of General Formula $Li_3V_2(PO_4)_{3-x}(BO_3)_x$ wherein x=1/4

Lithium hydroxide monohydrate ($LiOH-H_2O$), ammonium vanadate ($NH_4VO_3$), citric acid monohydrate, ammonium dihydrogen phosphate ($NH_4H_2PO_4$), and boric acid ($H_3BO_3$) were weighed to a molar ratio $LiOH-H_2O$:$NH_4VO_3$:citric acid monohydrate:$NH_4H_2PO_4$:$H_3BO_3$ of 3.03:2:1.5:11/4:1/4. In the order listed, they were added to purified water and stirred. Every time a raw material was added, it was confirmed that the raw material dissolved. Next, the solvent was removed on a hot plate having a temperature of 80° C. to give a precursor. The precursor was thoroughly pulverized in an automatic mortar, then placed in a sagger made of alumina (outer dimension: 90×90×50 mm), and calcined under nitrogen gas flow (flow rate: 1.0 l/min) using an atmosphere-replacement-type calcination furnace (desktop vacuum gas replacement furnace KDF-75 manufactured by DENKEN). In preliminary calcination, the calcination temperature was 350° C., and the calcination time (duration of maintaining the calcination temperature) was 3 hours. In actual calcination, the calcination temperature was 850° C., and the calcination time was 6 hours. Incidentally, the temperature rise rate was 5° C./min, while the temperature drop was allowed to occur naturally. Next, the product was pulverized in an automatic mortar for 1 hour to a secondary particle size of 50 μm or less. In this state, a carbonaceous material originating from citric acid was present on the surface of primary particles of $Li_3V_2(PO_4)_3$. This also applied to the following examples and comparative example. The product is defined as an active material a1 of the present invention.

Example 2

Synthesis of $Li_3V_2(PO_4)_{23/8}(BO_3)_{1/8}$ of General Formula $Li_3V_2(PO_4)_{3-x}(BO_3)_x$ wherein x=1/8

A positive active material for a lithium secondary battery was synthesized in the same manner as in Example 1, except that lithium hydroxide monohydrate ($LiOH-H_2O$), ammonium vanadate ($NH_4VO_3$), citric acid monohydrate, ammonium dihydrogen phosphate ($NH_4H_2PO_4$), and boric acid ($H_3BO_3$) were weighed to a molar ratio $LiOH-H_2O$:$NH_4VO_3$:citric acid monohydrate:$NH_4H_2PO_4$:$H_3BO_3$ of 3.03:2:1.5:23/8:1/8. The product is defined as an active material a2 of the present invention.

Example 3

Synthesis of $Li_3V_2(PO_4)_{47/16}(BO_3)_{1/16}$ of General Formula $Li_3V_2(PO_4)_{3-x}(BO_3)_x$ wherein x=1/16

A positive active material for a lithium secondary battery was synthesized in the same manner as in Example 1, except that lithium hydroxide monohydrate ($LiOH-H_2O$), ammonium vanadate ($NH_4VO_3$), citric acid monohydrate, ammonium dihydrogen phosphate ($NH_4H_2PO_4$), and boric acid ($H_3BO_3$) were weighed to a molar ratio $LiOH-H_2O$:$NH_4VO_3$:citric acid monohydrate:$NH_4H_2PO_4$:$H_3BO_3$ of 3.03:2:1.5:47/16:1/16. The product is defined as an active material a3 of the present invention.

Example 4

Synthesis of $Li_3V_2(PO_4)_{95/32}(BO_3)_{1/32}$ of General Formula $Li_3V_2(PO_4)_{3-x}(BO_3)_x$ wherein x=1/32

A positive active material for a lithium secondary battery was synthesized in the same manner as in Example 1, except that lithium hydroxide monohydrate ($LiOH-H_2O$), ammonium vanadate ($NH_4VO_3$), citric acid monohydrate, ammonium dihydrogen phosphate ($NH_4H_2PO_4$), and boric acid ($H_3BO_3$) were weighed to a molar ratio $LiOH-H_2O$:$NH_4VO_3$:citric acid monohydrate:$NH_4H_2PO_4$:$H_3BO_3$ of 3.03:2:1.5:95/32:1/32. The product is defined as an active material a4 of the present invention.

Example 5

Synthesis of $Li_3V_2(PO_4)_{191/64}(BO_3)_{1/64}$ of General Formula $Li_3V_2(PO_4)_{3-x}(BO_3)_x$ wherein x=1/64

A positive active material for a lithium secondary battery was synthesized in the same manner as in Example 1, except that lithium hydroxide monohydrate ($LiOH-H_2O$), ammonium vanadate ($NH_4VO_3$), citric acid monohydrate, ammonium dihydrogen phosphate ($NH_4H_2PO_4$), and boric acid ($H_3BO_3$) were weighed to a molar ratio $LiOH-H_2O$:$NH_4VO_3$:citric acid monohydrate:$NH_4H_2PO_4$:$H_3BO_3$ of 3.03:2:1.5:191/64:1/64. The product is defined as an active material a5 of the present invention.

Example 6

Synthesis of $Li_3V_2(PO_4)_{383/128}(BO_3)_{1/128}$ of General Formula $Li_3V_2(PO_4)_{3-x}(BO_3)_x$ wherein x=1/128

A positive active material for a lithium secondary battery was synthesized in the same manner as in Example 1, except that lithium hydroxide monohydrate ($LiOH-H_2O$), ammonium vanadate ($NH_4VO_3$), citric acid monohydrate, ammonium dihydrogen phosphate ($NH_4H_2PO_4$), and boric acid ($H_3BO_3$) were weighed to a molar ratio $LiOH-H_2O$:$NH_4VO_3$:citric acid monohydrate:$NH_4H_2PO_4$:$H_3BO_3$ of 3.03:2:1.5:383/128:1/128. The product is defined as an active material a6 of the present invention.

Comparative Example 1

Synthesis of $Li_3V_2(PO_4)_3$ of General Formula $Li_3V_2(PO_4)_{3-x}(BO_3)_x$ wherein x=0

A positive active material for a lithium secondary battery was synthesized in the same manner as in Example 1, except that lithium hydroxide monohydrate ($LiOH-H_2O$), ammonium vanadate ($NH_4VO_3$), citric acid monohydrate, ammonium dihydrogen phosphate ($NH_4H_2PO_4$), and boric acid ($H_3BO_3$) were weighed to a molar ratio $LiOH-H_2O$:$NH_4VO_3$:citric acid monohydrate:$NH_4H_2PO_4$:$H_3BO_3$ of 3.03:2:1.5:3:0. This is defined as a comparative active material b1.

Comparative Example 2

Synthesis of $Li_3V_2(PO_4)_{5/2}(BO_3)_{1/2}$ of General Formula $Li_3V_2(PO_4)_{3-x}(BO_3)_x$ wherein x=1/2

A positive active material for a lithium secondary battery was synthesized in the same manner as in Example 1, except that lithium hydroxide monohydrate (LiOH—$H_2O$), ammonium vanadate ($NH_4VO_3$), citric acid monohydrate, ammonium dihydrogen phosphate ($NH_4H_2PO_4$), and boric acid ($H_3BO_3$) were weighed to a molar ratio LiOH—$H_2O$:$NH_4VO_3$:citric acid monohydrate:$NH_4H_2PO_4$:$H_3BO_3$ of 3.03:2:1.5:5/2:1/2. This is defined as a comparative active material b2.

Comparative Example 3

Synthesis of $Li_3V_2(PO_4)_2(BO_3)_1$ of General Formula $Li_3V_2(PO_4)_{3-x}(BO_3)_x$ wherein x=1

A positive active material for a lithium secondary battery was synthesized in the same manner as in Example 1, except that lithium hydroxide monohydrate (LiOH—$H_2O$), ammonium vanadate ($NH_4VO_3$), citric acid monohydrate, ammonium dihydrogen phosphate ($NH_4H_2PO_4$), and boric acid ($H_3BO_3$) were weighed to a molar ratio LiOH—$H_2O$:$NH_4VO_3$:citric acid monohydrate:$NH_4H_2PO_4$:$H_3BO_3$ of 3.03:2:1.5:2:1. This is defined as a comparative active material b3.

Comparative Example 4

Synthesis of $Li_3V_2(PO_4)_{11/4}(WO_4)_{1/4}$ of General Formula $Li_3V_2(PO_4)_{3-x}(WO_4)_x$ wherein x=1/4

A positive active material for a lithium secondary battery was synthesized in the same manner as in Example 1, except that lithium hydroxide monohydrate (LiOH—$H_2O$), ammonium vanadate ($NH_4VO_3$), citric acid monohydrate, ammonium dihydrogen phosphate ($NH_4H_2PO_4$), and tungstic acid ($H_2WO_4$) in place of boric acid were weighed to a molar ratio LiOH—$H_2O$:$NH_4VO_3$:citric acid monohydrate:$NH_4H_2PO_4$:$H_2WO_4$ of 3.03:2:1.5:11/4:1/4. This is defined as a comparative active material b4.

Comparative Example 5

Synthesis of $Li_3V_2(PO_4)_{47/16}(WO_4)_{1/16}$ of General Formula $Li_3V_2(PO_4)_{3-x}(WO_4)_x$ wherein x=1/16

A positive active material for a lithium secondary battery was synthesized in the same manner as in Example 1, except that lithium hydroxide monohydrate (LiOH—$H_2O$), ammonium vanadate ($NH_4VO_3$), citric acid monohydrate, ammonium dihydrogen phosphate ($NH_4H_2PO_4$), and tungstic acid ($H_2WO_4$) in place of boric acid were weighed to a molar ratio LiOH—$H_2O$:$NH_4VO_3$:citric acid monohydrate:$NH_4H_2PO_4$:$H_2WO_4$ of 3.03:2:1.5:47/16:1/16. This is defined as a comparative active material b5.

Comparative Example 6

Synthesis of $Li_3V_2(PO_4)_{11/4}(MoO_4)_{1/4}$ of General Formula $Li_3V_2(PO_4)_{3-x}(MoO_4)_x$ wherein x=1/4

A positive active material for a lithium secondary battery was synthesized in the same manner as in Example 1, except that lithium hydroxide monohydrate (LiOH—$H_2O$), ammonium vanadate ($NH_4VO_3$), citric acid monohydrate, ammonium dihydrogen phosphate ($NH_4H_2PO_4$), and molybdic acid ($H_2MoO_4$) in place of boric acid were weighed to a molar ratio LiOH—$H_2O$:$NH_4VO_3$:citric acid monohydrate:$NH_4H_2PO_4$:$H_2MoO_4$ of 3.03:2:1.5:11/4:1/4. This is defined as a comparative active material b6.

Comparative Example 7

Synthesis of $Li_3V_2(PO_4)_{47/16}(MoO_4)_{1/16}$ of General Formula $Li_3V_2(PO_4)_{3-x}(MoO_4)_x$ wherein x=1/16

A positive active material for a lithium secondary battery was synthesized in the same manner as in Example 1, except that lithium hydroxide monohydrate (LiOH—$H_2O$), ammonium vanadate ($NH_4VO_3$), citric acid monohydrate, ammonium dihydrogen phosphate ($NH_4H_2PO_4$), and molybdic acid ($H_2MoO_4$) in place of boric acid were weighed to a molar ratio LiOH—$H_2O$:$NH_4VO_3$:citric acid monohydrate:$NH_4H_2PO_4$:$H_2MoO_4$ of 3.03:2:1.5:47/16:1/16. This is defined as a comparative active material b7.

By X-ray diffraction measurement using CuKα ray, all the active materials synthesized in the above examples and comparative examples were confirmed to have the desired crystal structure having $Li_3V_2(PO_4)_3$ as the main phase. The BET specific surface area and particle size distribution were also measured. The particle size distribution was measured as follows. A sample was thoroughly kneaded with a surfactant, and ion-exchange water was added thereto, followed by ultrasonic dispersion. Measurement was then performed at 20° C. using a laser diffraction/scattering particle size distribution analyzer (SALD-2000J manufactured by SHIMADZU). Some of the analysis results are shown in Table 1.

TABLE 1

| Active Material | $BO_3$-Substituted Amount x | | Specific Surface Area/$m^2 g^{-1}$ | Particle Size Distribution/μm | |
|---|---|---|---|---|---|
| | | | | Mode Diameter | $D_{50}$ |
| b3 | 1 | 1 | 32.5 | 20.7 | 16.9 |
| b2 | 1/2 | $2^{-1}$ | 21.9 | 20.7 | 13.2 |
| a1 | 1/4 | $2^{-2}$ | 28.9 | 13.9 | 7.9 |
| a2 | 1/8 | $2^{-3}$ | 43.7 | 13.9 | 8.7 |
| a3 | 1/16 | $2^{-4}$ | 38.1 | 13.9 | 7.9 |
| a4 | 1/32 | $2^{-5}$ | 36.7 | 20.7 | 7.7 |
| a5 | 1/64 | $2^{-6}$ | 51.3 | 20.7 | 12.2 |
| a6 | 1/128 | $2^{-7}$ | 52.2 | 20.7 | 10.6 |
| b1 | 0 | 0 | 29.0 | 16.9 | 4.6 |

Production of Positive Electrode

A positive electrode paste containing the above positive active material, acetylene black as an electrical conductor, and polyvinylidene fluoride (PVdF) as a binder in a weight ratio of 82:10:8 and also containing N-methyl-2-pyrrolidone (NMP) as a solvent was prepared. The positive electrode paste was applied to both sides of an aluminum mesh current collector having an aluminum terminal, and NMP was removed at 80° C. After that, it was folded such that the application region was in two layers and the projected area of the application region was halved, and then pressed such that the thickness after folding was 400 μm. A positive electrode was thus obtained. The active material application area is 2.25 $cm^2$, and the application weight is 0.071 g. The positive electrode was vacuum-dried at 150° C. for 5 hours or more, and used after the removal of moisture in the electrode plate.

Production of Negative Electrode

A negative electrode was obtained by attaching a 300-μm-thick lithium metal foil to both sides of a SUS316 mesh current collector having a SUS316 terminal, followed by pressing.

Production of Reference Electrode

A reference electrode was obtained by attaching a 300-μm-thick lithium metal foil to a SUS316 current-collecting bar.

Preparation of Electrolyte Solution $LiPF_6$ as a fluorine-containing electrolyte salt was dissolved in a concentration of 1.0 mol/l in a mixed solvent containing ethylene carbonate, dimethyl carbonate, and ethyl methyl carbonate mixed in a volume ratio of 1:1:1, thereby preparing a nonaqueous electrolyte. The moisture content of the nonaqueous electrolyte was less than 50 ppm.

Assembly of Battery

A lithium ion secondary battery made of glass was assembled in an Ar box having a dew point of −40° C. or less. One positive electrode, one negative electrode, and one reference electrode were inserted into gold-plated clips having a conductor previously fixed to a case cover, and they were fixed such that the positive and negative electrodes face each other. The reference electrode was fixed to a position behind the positive electrode as seen from the negative electrode. Next, a cup made of polypropylene containing a certain amount of an electrolyte solution was placed in a glass case. The case was then covered in such a manner that the positive electrode, the negative electrode, and the reference electrode were immersed in the electrolyte solution, thereby assembling a battery.

Positive electrodes were produced using the positive active materials of Examples 1 to 6 and Comparative Examples 1 to 7, and lithium secondary batteries were assembled as above.

High-Temperature Storage Test

First, the above lithium secondary batteries were each subjected to a charge-discharge process at a temperature of 25° C., in which two charge-discharge cycles were performed. Charge conditions were as follows: constant-current constant-voltage charge at a current of 0.9 mA and a voltage of 4.5 V for 15 hours. Discharge conditions were as follows: constant-current discharge at a current of 0.9 mA and a final voltage of 2.7 V. At this time, the discharge capacity obtained in the second cycle was recorded as "discharge capacity before high-temperature storage (mAh)".

Next, one time charge was performed at a temperature of 25° C. under the same conditions as in the above charge-discharge process, and then only the positive electrode was taken out in an Ar box having a dew point of −40° C. or less. The positive electrode and 1 ml of an electrolyte solution were placed in an aluminum-laminated bag. The bag was sealed and stored in a thermostatic chamber of 60° C. for 25 days.

The bag was taken out from the thermostatic chamber, naturally cooled to a temperature of 25° C. in an Ar box having a dew point of −40° C. or less, and then opened. For the evaluation of the degree of self discharge after high-temperature storage, a lithium secondary battery was assembled again as above, and the remaining discharge capacity was checked at a temperature of 25° C. Discharge conditions were as follows: constant-current discharge at a current of 0.9 mA and a final voltage of 2.0 V. This discharge capacity was recorded as "capacity after high-temperature storage (mAh)", and its percentage relative to the "discharge capacity before high-temperature storage (mAh)" was defined as "high-temperature storage performance (%)."

The results of the high-temperature storage test are shown in Tables 2 and 3.

TABLE 2

|  | $BO_3$-Substituted Amount x | Discharge Capacity before High-Temperature Storage/mAh g$^{-1}$ | High-Temperature Storage Performance/% |
|---|---|---|---|
| Example 1 | 1/4 | 141.5 | 71.6 |
| Example 2 | 1/8 | 145.3 | 73.6 |
| Example 3 | 1/16 | 153.4 | 76.5 |
| Example 4 | 1/32 | 151.9 | 77.8 |
| Example 5 | 1/64 | 151.0 | 75.7 |
| Example 6 | 1/128 | 147.1 | 73.3 |
| Comparative Example 1 | 0 | 161.7 | 52.7 |
| Comparative Example 2 | 1/2 | 125.7 | 65.8 |
| Comparative Example 3 | 1 | 95.8 | 41.4 |

TABLE 3

| | Discharge Capacity/mAh g$^{-1}$ Substituent Anion | | | | | |
|---|---|---|---|---|---|---|
| | $BO_3$ | | $WO_4$ | | $MoO_4$ | |
| | Example | | | | | |
| | Example 1 | Example 3 | Comparative Example 4 | Comparative Example 5 | Comparative Example 6 | Comparative Example 7 |
| Substituted Amount (molar ratio) | 8.3% | 2.1% | 8.3% | 2.1% | 8.3% | 2.1% |
| Discharge Capacity before High-Temperature Storage | 141.5 | 153.4 | 127.4 | 148.5 | 107.8 | 147.2 |
| Discharge Capacity after High-Temperature Storage | 101.3 | 117.4 | 80.4 | 11.0 | 29.0 | 111.2 |
| High-Temperature Storage Performance/% | 71.6% | 76.5% | 63.1% | 74.7% | 26.9% | 75.5% |

Table 2 shows the following. In Comparative Example 1 using $Li_3V_2(PO_4)_3$ ($BO_3$ substituted amount x=0), the discharge capacity before high-temperature storage is the largest, 161.7 mAh/g, but the high-temperature storage performance is 52.7% (discharge capacity after high-temperature storage is 85.2 mAh/g). In contrast, when some of the $PO_4$ anions in $Li_3V_2(PO_4)_3$ are substituted with $BO_3$ anions into $Li_3V_2(PO_4)_{3-x}(BO_3)_x$, although the discharge capacity before high-temperature storage is lower than $Li_3V_2(PO_4)_3$, in Examples 1 to 6 where x is not more than 1/4 ($2^{-2}$), the high-temperature storage performance is more than 70%, and also the discharge capacity after high-temperature storage is more than 100 mAh/g, indicating improved high-temperature storage performance and high discharge capacity. In particular, within a range of 1/128 ($2^{-7}$)≤x≤1/8 ($2^{-3}$) (Examples 2 to 6), the high-temperature storage performance is 73 to 78%, and also the discharge capacity after high-temperature storage is not less than 107 mAh/g. That is, high-temperature storage performance is significantly improved.

However, when x is more than 1/4 ($2^{-2}$), as shown by Comparative Examples 2 and 3, the discharge capacity before high-temperature storage decreases, and also high-temperature storage performance decreases. Therefore, it is preferable that $0<x\leq2^{-2}$.

Table 3 shows the following. In lithium secondary batteries with $PO_4$ in $Li_3V_2(PO_4)_3$ being partially substituted with $BO_3$, the high-temperature storage performance is more than 70% both in the cases where the substituted amount is 2.1 mol % (x=$2^{-4}$) and 8.3 mol % (x=$2^{-2}$). In contrast, in lithium secondary batteries with $PO_4$ in $Li_3V_2(PO_4)_3$ being partially substituted with $WO_4$ or $MoO_4$, although the high-temperature storage performance is more than 70% in the case where the substituted amount is 2.1 mol %, the high-temperature storage performance is much lower than 70% in the case the substituted amount is 8.3 mol %. Therefore, it can be said that only a lithium secondary battery with $PO_4$ in $Li_3V_2(PO_4)_3$ being partially substituted with $BO_3$ is advantageous within a specific substituted amount range.

INDUSTRIAL APPLICABILITY

A lithium secondary battery using the positive active material of the present invention is suitable for applications to the field where industrial batteries with particularly higher capacity are demanded, such as electric vehicles that are expected to be further developed. Therefore, the industrial applicability thereof is extremely high.

The invention claimed is:

1. A positive active material for a lithium secondary battery, having general formula $Li_3V_2(PO_4)_{3-x}(BO_3)_x$ wherein $2^{-7}\leq x\leq 2^{-2}$.

2. The positive active material for a lithium secondary battery according to claim 1, wherein carbon is supported on the surfaces of particles of the positive active material.

3. The positive active material for a lithium secondary battery according to claim 1, wherein the particle size of D50 for the active material is 7.7 to 16.9 μm.

4. A positive electrode for a lithium secondary battery, comprising the positive active material according to claim 1.

5. A lithium secondary battery comprising the positive electrode according to claim 4, a negative electrode, and a nonaqueous electrolyte.

6. A positive active material for a lithium secondary battery, having general formula $Li_3V_2(PO_4)_{3-x}(BO_3)_x$ wherein x is $2^{-7}\leq x\leq 2^{-3}$.

7. The positive active material for a lithium secondary battery according to claim 6, wherein carbon is supported on the surfaces of particles of the positive active material.

8. The positive active material for a lithium secondary battery according to claim 6, wherein the particle size of D50 for the active material is 7.7 to 16.9 μm.

9. A positive electrode for a lithium secondary battery, comprising the positive active material according to claim 6.

10. A lithium secondary battery comprising the positive electrode according to claim 9, a negative electrode, and a nonaqueous electrolyte.

* * * * *